United States Patent [19]

Puigcerver et al.

[11] Patent Number: 5,308,923
[45] Date of Patent: May 3, 1994

[54] ENCLOSURE ASSEMBLY FOR TELECOMMUNICATION CABLES

[75] Inventors: Luis O. Puigcerver, Fuquay-Varina; Mark A. Harvell, Lillington; Barry W. Allen, Siler City; William J. Rathbun, Raleigh, all of N.C.

[73] Assignee: Raychem Corporation, Menlo Park, Calif.

[21] Appl. No.: 899,667

[22] Filed: Jun. 16, 1992

[51] Int. Cl.⁵ .............................................. H02G 7/20
[52] U.S. Cl. ........................................ 174/87; 174/43; 174/44
[58] Field of Search ............... 174/87, 37, 38, 43, 174/44; 220/293, 298, 300

[56] References Cited

U.S. PATENT DOCUMENTS

| 2,675,040 | 4/1954 | Raun et al. | 220/298 |
| 3,107,810 | 10/1963 | King | 220/298 X |
| 3,557,299 | 1/1971 | Dienes | 174/38 |
| 3,728,467 | 4/1973 | Klayum et al. | 174/38 |
| 3,848,074 | 11/1974 | Channell | 174/38 |
| 4,097,683 | 6/1978 | Summers | 174/38 |
| 4,212,408 | 7/1980 | Valenzona | 220/293 X |
| 4,382,155 | 5/1983 | Borin et al. | 174/38 |
| 5,055,636 | 10/1991 | Jaycox | 174/87 |
| 5,059,748 | 10/1991 | Allen et al. | 174/87 |
| 5,069,516 | 12/1991 | Kohy et al. | 174/38 X |

FOREIGN PATENT DOCUMENTS

1058598 11/1955 France ................... 220/298

Primary Examiner—Morris H. Nimmo
Attorney, Agent, or Firm—Herbert G. Burkard; William D. Zahrt II; A. Stephen Zavell

[57] ABSTRACT

The cover and base of the enclosure of the assembly are releasably connected by latches and flanges integral with the cover and base. A mounting bracket facilitates mounting of the assembly upon a telephone pole or other exposed static structure. Vertically spaced upper and lower cable strain-relieving members underlie each cable passageway of the base of the enclosure. Each strain-relieving member is of generally u-shaped configuration. The open ends of the upper and lower strain-relieving members face in different directions. Each pair of the strain-relieving members collectively extends about the entire circumference of a cable engaged thereby.

21 Claims, 7 Drawing Sheets

ENCLOSURE ASSEMBLY FOR TELECOMMUNICATION CABLES

FIELD OF THE INVENTION

This invention relates to telecommunication enclosures of the type that are mounted upon poles, the exterior walls of buildings, or upon other exposed structures. The enclosure assembly is particularly, but not necessarily exclusively, adapted to receive and protect splices between telecommunications cables, such as distribution and drop wire cables.

BACKGROUND OF THE INVENTION

U.S. Pat. No. 5,059,748, which is owned by the assignee of the present application, discloses an enclosure assembly for splice connections between telecommunication cables. The enclosure of the prior patent includes base and cover members that are releasably interconnected by an annular clamp that is separate from such members and has arcuate sections that undergo pivotal movement relative to each other. Connection of the cover and base members of the enclosure to each other requires that the telecommunication craftsperson first pivot the clamp sections away from each other, then move them and a separate sealing ring into encircling relationship with adjacent end portions of the base and cover members, and then tighten the clamp by rotating a threaded fastener extending through lugs of the clamp. Separation of the cover and base members from each other requires a reverse sequence of the foregoing steps. Retention of the cables within generally U-shaped strain relief members associated with the patented enclosure also requires that the craftsperson secure retainer strips over the open sides of the strain relief members.

SUMMARY OF THE INVENTION

The present invention provides a cable splice enclosure assembly having base and cover members that are releasably interconnected by cooperating elements that are integral with respective ones of such members. Connection of the base and cover members to each other and to a pole, building or other static structure can be quickly and easily accomplished. Disconnection of the base and cover members from each other, and/or removal of the entire enclosure from a pole or the like, can be accomplished with equal facility and speed. The improved cable splice enclosure assembly also includes strain relieving members that readily receive cables passing into and/or from the enclosure and that have open ends which do not need to be overlaid by closure members. The enclosure assembly of the invention further includes a mounting bracket that may be quickly and easily connected in of a plurality of different ways to a pole or other static structure, and that slidably receives a bracket which supports the enclosure base member and the strain-relief members of the assembly.

DESCRIPTION OF THE PRIOR ART

Previously noted U.S. Pat. No. 5,059,748 is of interest relevant to the present invention.

DESCRIPTION OF THE DRAWINGS

Other features of the invention will be apparent from the following description of illustrative embodiments thereof, which should be read in conjunction with the accompanying drawings, in which.

DESCRIPTION OF THE PREFERRED EMBODIMENTS

Figure 1:
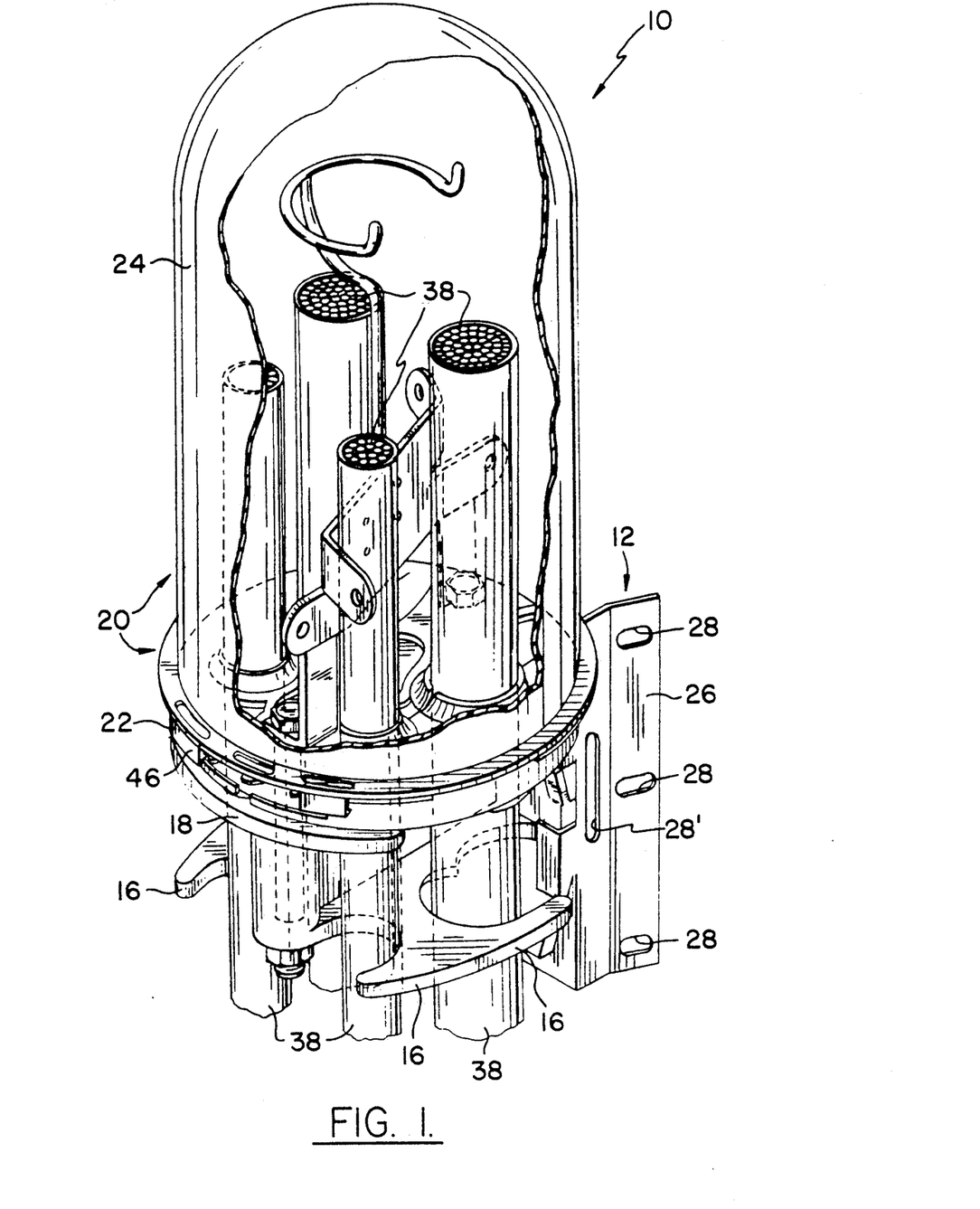
FIG. 1 is a top front perspective view of a cable splice enclosure assembly in accordance with the invention and of cables associated therewith, the cover of the enclosure being partially broken away to show illustrative conventional harness and other interior components of the enclosure.
Figure 2:
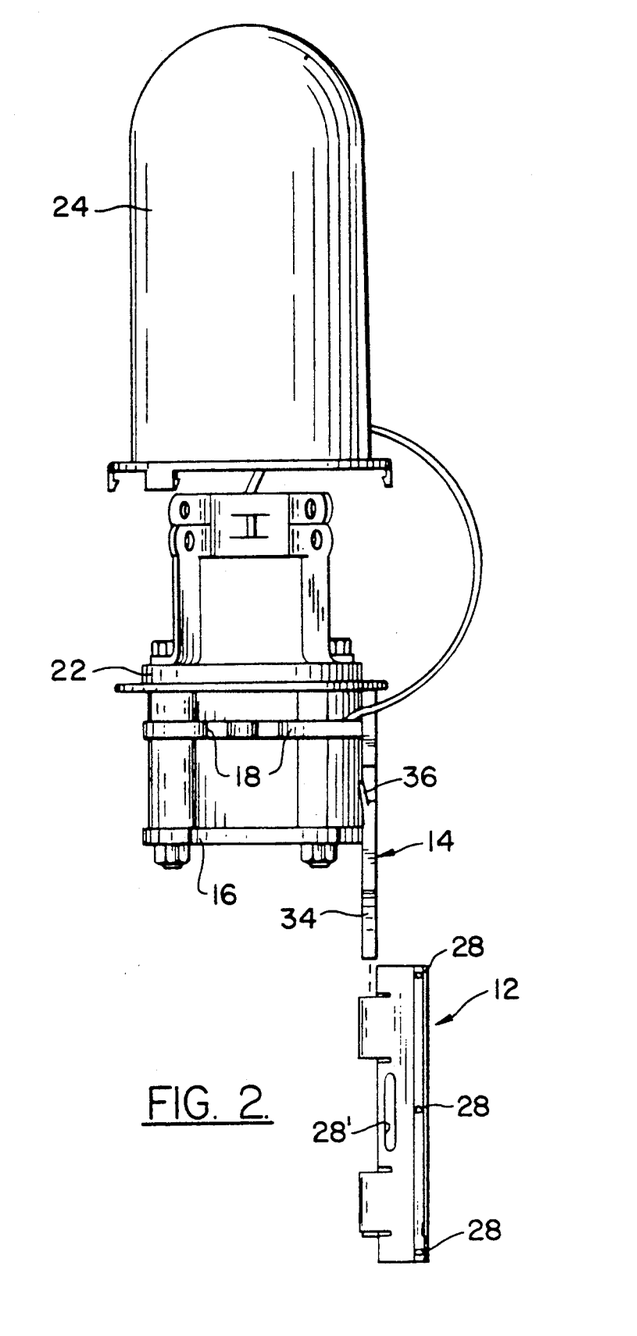
FIG. 2 is a vertically exploded side elevational view of the assembly of FIG. 1.

The cable splice enclosure assembly identified in its entirety in FIG. 1 by the numeral 10 generally includes a mounting bracket 12 adapted to be secured to a telephone pole, exterior building wall or other static structure; a support bracket 14 connectable to and disconnected from mounting bracket 12; lower and upper cable strain-relieving members 16,18, respectively; and a cable splice enclosure 20 having a generally disc-shaped circular base 22 and a generally dome-shaped removable cover 24 that are loosely connected by a cord 25.

Figures 6, 7, 8, 9:
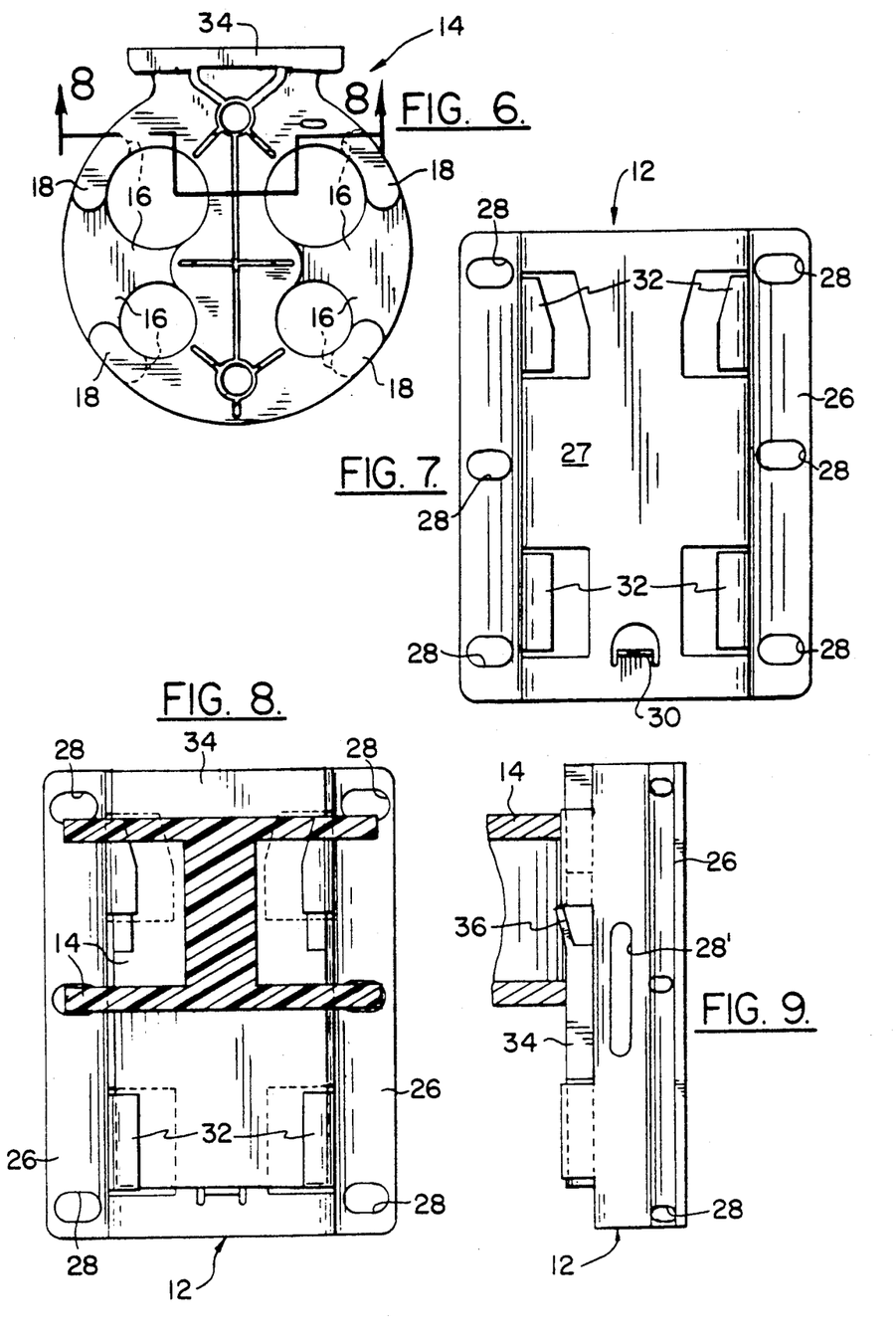
FIG. 6 is a top plan view of a support bracket and associated cable strain-relieving members of the assembly.
FIG. 7 is a front elevational view of a bracket for mounting the enclosure and strain relieving members of the assembly upon a telephone pole or other static structure.
FIG. 8 is a rear elevational view of the bracket of FIG. 7, and also showing in vertical section, taken along the line 8—8 of FIG. 6, a support bracket in mated relationship with the mounting bracket.
FIG. 9 is a side elevational view of the mounting bracket of FIGS. 7 and 8, fragmentary portions of the FIG. 6 support bracket also being shown.

Referring now particularly to FIGS. 1, 2 and 7-9 of the drawings, mounting bracket 12 has opposite side edge sections 26 that extend rearwardly and outwardly from a central section 27 of the bracket. Relatively small openings 28 within side sections 26 are adapted to receive screws or similar headed fasteners (not shown) capable of securing the bracket to a telephone pole, exterior building wall, or the like. As is best shown in FIGS. 1 and 9, opposite side sections of bracket 12 also have elongated slot-like openings 28' through which a flexible strap (not shown) may be passed for the purpose of securing bracket 12 to a pole or similar structure. A stop element 30 extends forwardly from the lower part of the central section of bracket 12. Guide elements 32 extent forwardly and then laterally inwardly from opposite sides of the central section of bracket 12 to define, in conjunction with the central section of the bracket, a trackway having an open upper end.

Figure 14:
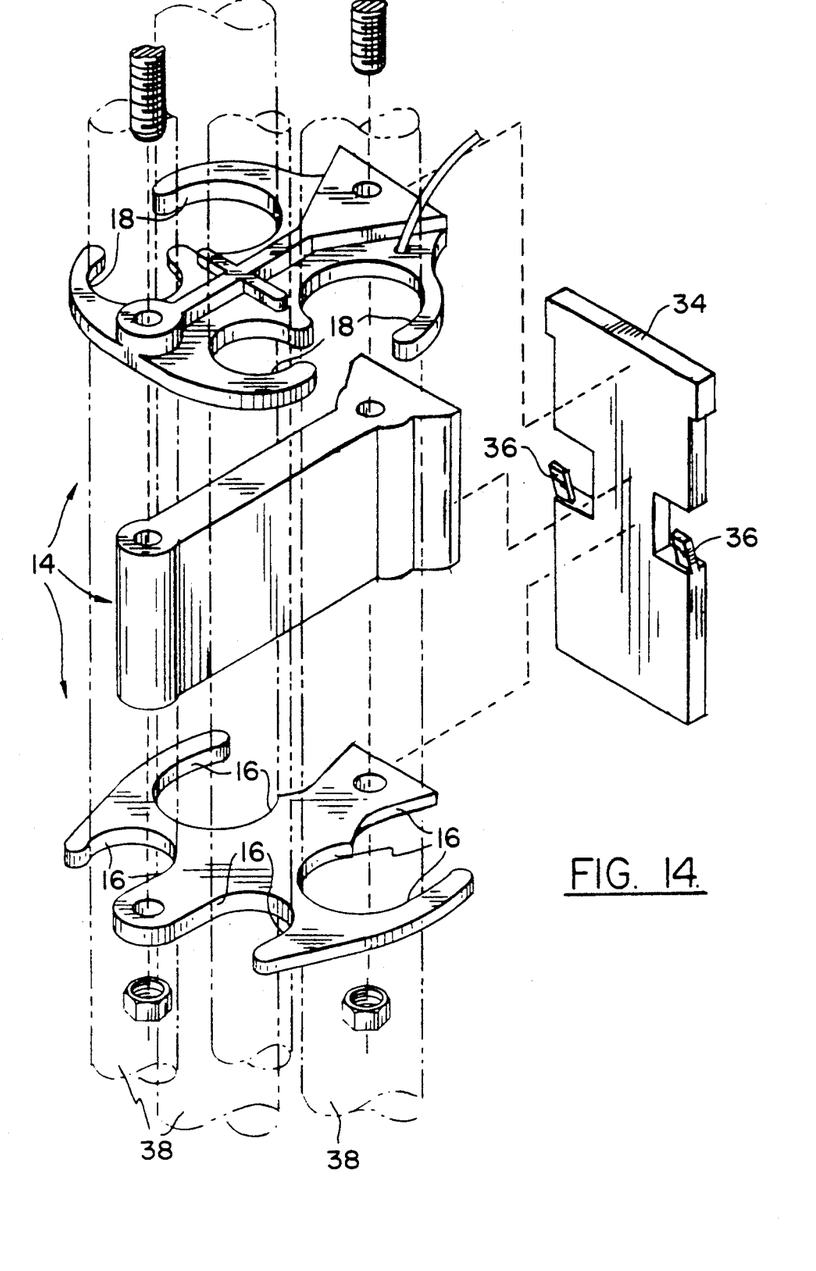
FIG. 14 is an exploded perspective view of components of the support bracket, and also showing in phantom lines cables passing through guide and strain relieving members of the support bracket.

The aforesaid trackway of mounting bracket 12 is adapted to slidably receive, through its open upper end, a support plate 34 of support bracket 14. When received within the aforesaid trackway of mounting bracket 12, the bottom of plate 34 abuts stop element 30 of mounting bracket 12. As is best shown in FIG. 14, resiliently flexible latch elements 36 adjacent opposite side edges of plate 34 then extend into underlying engagement with the upper pair of guide elements 32 of support bracket 14, so as to then prevent inadvertent removal of plate 34 from the support bracket 14. Intentional removal of plate 14 can be effected, when desired, by flexing latch elements 36 rearwardly, and then raising plate 34 upwardly.

Figures 3, 4, 5:
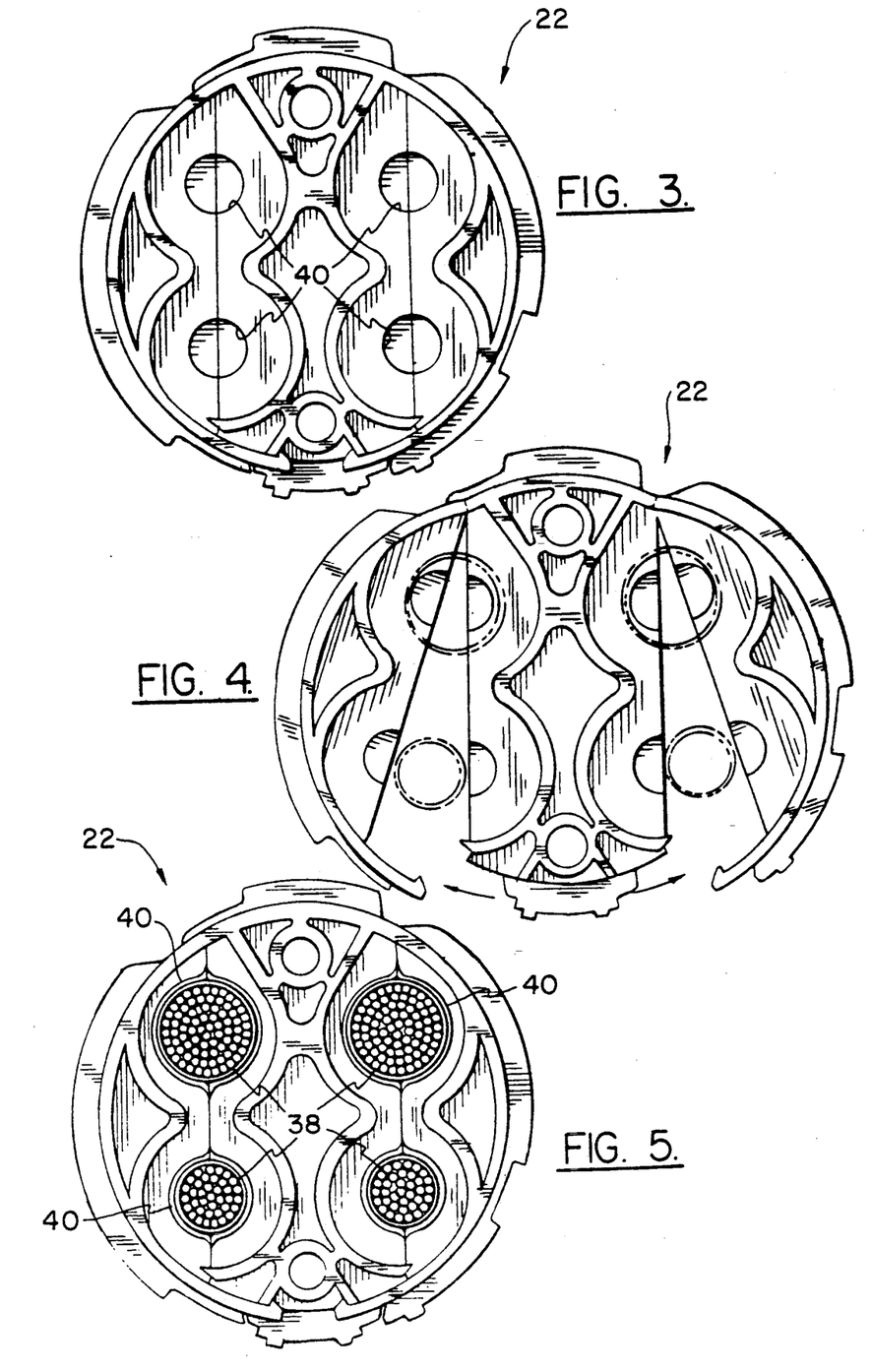
FIG. 3 is a top plan view of the segmental base of the enclosure of the assembly.
FIG. 4 is a top plan similar to FIG. 3 but showing side segments of the segmental base pivoted away from the central segment of the base, and also showing underlying cables in phantom lines.
FIG. 5 is a view similar to FIG. 3, but showing cables within the cable receiving openings of the base.

The components connected to and/or formed integrally with support bracket 14 include base member 22 of splice enclosure 20, and also include pairs of lower and upper strain-relieving members 16, 18. Base 12 of enclosure 20 is similar to the base member of the cable splice enclosure shown and described in U.S. Pat. No. 5,059,748, and the disclosure in such patent of such base member is incorporated herein by reference. As is best shown in FIGS. 3-5, base 12 is comprised of a plurality of sections that are pivotally movable relative to each other and contain protective sealant material that engages the cables 38 which pass through vertical cable passageways 40 of base 22. The sealant material prevents, or at release minimizes, entry of moisture and/or debris into the cable passageways. Base member 34 differs from the base member of U.S. Pat. No. 5,059,748 in that it illustratively has four cable passageways of two different diameters, rather than just two passageways of equal diameter.

Figure 15:
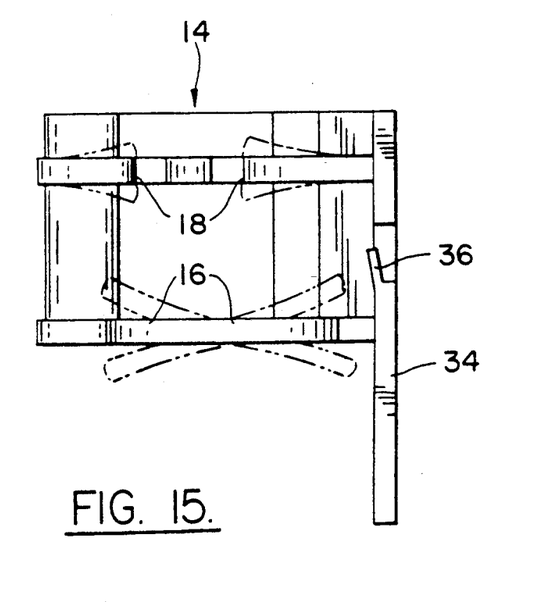
FIG. 15 is a side elevational view showing in phantom lines the flexibility of the cable strain receiving members of the assembly.

Paired lower and upper cable strain-relieving members 16, 18 underlie each of the cable passageways of enclosure base member 34. Members 16, 18 of each pair are spaced vertically from base member 22 and from each other, and are of generally u-shaped configuration. The open end of the upper member 18 of each pair faces in the first direction while the open end of the lower member 16 of the pair faces in a different, generally opposite, direction. The sizes of members 16, 18 are correlated to the diameter of the cable 38 engaged thereby. The members 16, 18 of each vertically associated pair collectively extend about at least most of the entire circumference of the cable 38 for which it provides strain relief, and preferably extend about more than the entire circumference of the cable. See, in the foregoing regard, the phantom line showing in FIG. 6, of the overlapping relationship, as viewed in plan, of the members 16, 18 of each vertically associated pair of strain-relieving members. The vertical spacing between the members 16, 18 of each pair, and the ability (shown in FIG. 15) of such members to undergo limited flexure, contributes to the ease with which cables 38 may be moved laterally into members 16, 18.

Figures 10, 11:
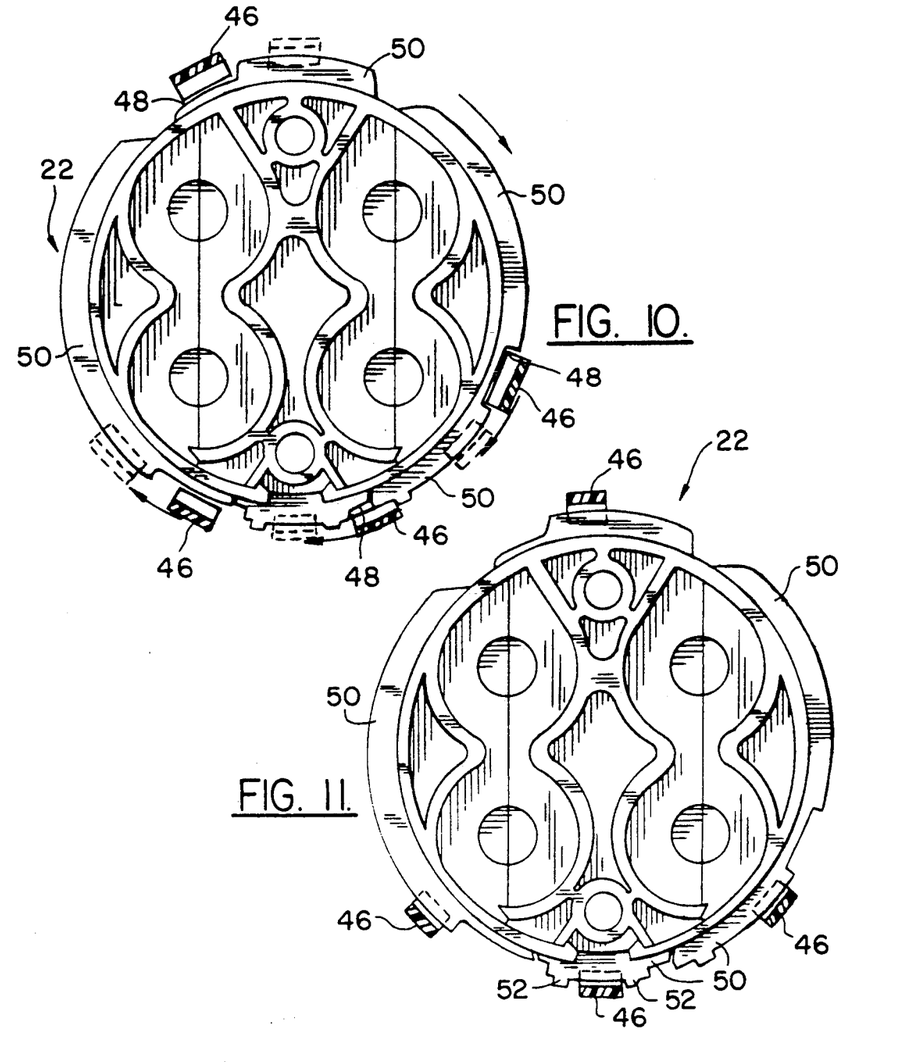
FIG. 10 is a top plan view of the base of the enclosure and also shows, in horizontal section and by phantom lines, movement of latch elements of the cover member into engagement with flange elements upon the base.
FIG. 11 is a view similar to FIG. 10, but showing the latch and flange elements engaged with each other.
Figure 12:
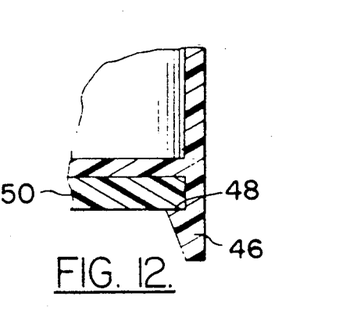
FIG. 12 is an enlarged fragmentary view showing latch and flange elements of the enclosure in engaged relationship.

The preferred method and means for releasably interconnecting base member 22 and dome-shaped cover member 24 of splice enclosure 20 are illustrated in FIGS. 10-12 of the drawings. As is shown in FIGS. 10 and 11, a plurality (illustratively four) of elongate latch elements 46 are connected to and extend downwardly from the circular lower edge of enclosure cover member 24, at spaced locations about the circumference of such edge. Each latch element 46 is of a type, shown in FIG. 12, having an interior shoulder 48 above its lower end. When the relative rotative positions of enclosure base and cover members 22, 24 are as shown FIG. 10, latch elements 46 extend freely into respective underlying ones of a plurality of underlying gaps 48 in flange elements 50 of enclosure base member 22. Relative rotative movement of members 22, 24 in the direction of the arrows shown in FIG. 10 displaces members 46 to their positions shown by phantom lines in FIG. 10, and by solid lines in FIG. 11. In such position, each latch element 46 captively receives the outer end portion of a thereto adjacent one of the enclosure base member flanges 50, as shown in FIG. 12. One of the flanges 50 (illustratively the lowermost one of FIG. 11) preferably and illustratively has outwardly extending detent elements 52 adjacent opposite sides of the latch element 46 engaging such flange element. The detent members prevent inadvertent relative rotative movement of significant magnitude between enclosure members 22, 24. When disconnection of members 22, 24 is desired, the positive rotative force to which elements 52 are than subjected cause them to deflect sufficiently as to permit passage of the aforesaid latch member 46 from the flange in question.

Figure 13:
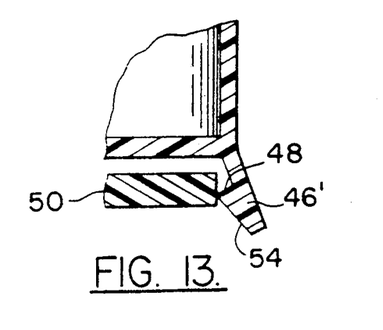
FIG. 13 is a view similar to FIG. 12 but showing another embodiment employing a resilient latch element that undergoes outward deflection in response to abutment with a flange of the base.

The above described latch elements 46 may be and preferably are of substantially rigid construction. However, in the alternative embodiment shown in FIG. 13 corresponding latch elements 46' are flexible. When flexible latch elements 46' are employed, interconnection of enclosure base and cover members 22, 24 can be effected by vertically aligning latch elements 46' with corresponding ones of the flange elements 50' that they are to engage, and by then effecting relative axial movement of enclosure base and cover members 22, 24 into engagement with each other. During such axial movement, the beveled can surface 54 of each latch element 46' causes the latch element to extend outwardly as shown in FIG. 13. Continued axial movement of members 22, 24 toward each other, in conjunction with resilient return movement of latch member to its undeflected position, causes latch 46' to captively engage the outer edge portion of the adjacent flange element 50. Subsequent disconnection of members 22, 24 from each other can be effected by imparting relative rotative movement to the members in the same manner as described in connection with the embodiment of FIGS. 10-12.

While preferred embodiments of the invention have been shown and described, this was for purposes of illustration only, and not for purposes of limitation, the scope of the invention being in accordance with the following claims.

We claim:

1. A reenterable enclosure assembly for telecommunication cable, comprising:

a base member having at least one cable passageway through which a cable extends;

a removable cover member overlying said base member;

a pair of cable strain-relieving members underlying said cable passageway of said base, said cable strain-relieving members being spaced vertically from each other, each of said strain-relieving members being of generally u-shaped configuration and having an open end through which said cable passes during lateral movement thereof into said strain-relieving member.

2. An assembly as in claim 1, wherein said strain-relieving members face in different directions from each other.

3. An assembly as in claim 1, wherein said strain-relieving members are substantially parallel.

4. An assembly as in claim 1, wherein a first one of said strain-relieving members limits lateral movement of said cable in a first direction, and a second one of said strain-relieving members limits lateral movement of said cable in a second direction different from said first direction.

5. An assembly as in claim 1, wherein said strain-relieving members extend in transverse relationship to said cable.

6. An assembly as in claim 1, wherein said base member has a plurality of cable passageways extending therethrough, and wherein said strain-relieving member pairs have corresponding openings which underlie each of said cable passageways.

7. An assembly as in claim 6, wherein said cable passageways include a first cable passageway of relatively large diameter and a second passageway of relatively small diameter.

8. An assembly as in claim 7, wherein said strain-relieving members include a first pair of openings of relatively large size underlying said first mentioned cable passageway, and a second pair of openings of relatively small size underlying said second cable passageway.

9. An assembly as in claim 1, wherein said base member includes a plurality of sections that are pivotally moveable relative to each other and contain protective sealant material engaging said cable and resisting entry of moisture and debris into said cable passageway.

10. An assembly as in claim 1, wherein end portions of said upper and lower strain-relieving members overlap each other as viewed in plan.

11. An assembly as in claim 1, wherein said strain relieving members collectively extend around more than the entire circumference of said cable.

12. An assembly as in claim 1, and further including connecting means upon said base member and upon said cover member for in a first relative rotative position of said members connecting said members to each other, and in a second relative rotative position thereof permitting removal of said cover member from said base member.

13. An assembly as in claim 1, wherein said cover member has a generally circular lower edge portion and said connecting means includes latch elements carried by and extending downwardly from said lower edge portion of said cover member at spaced locations about the circumference of said edge portion of said cover member.

14. An assembly as in claim 13, wherein said base member is of generally circular shape and said connecting means further includes flange elements carried by extending outwardly from said base member at spaced locations about the circumference thereof, said latch elements and said flange elements engaging each other and securing said cover member and said base member together in a first relative rotative position of said members, and said latch members and said flange members being out of engagement with each other and permitting removal of said cover member from said base member in another relative rotative position of said members.

15. An assembly as in claim 14, and further including detent elements upon one of said flange elements of said base member, said detent elements impeding relative rotative movement of said base and cover members from said first relative rotative position thereof.

16. An assembly as in claim 15, wherein said latch elements are of generally L-shaped configuration.

17. An assembly as in claim 1, and further including a mounting bracket adapted to be affixed to a static structure, and a support bracket connectable to and disconnectable from said mounting bracket, said base member and said cable strain-relieving member being connected to and supported by said support bracket.

18. An assembly as in claim 17, wherein said mounting bracket includes a plate member having rearwardly extending opposite side edge sections having openings therein for receiving fastener elements; and a central section having generally L-shaped guide elements adjacent opposite sides thereof; and a fowardly extending stop element adjacent the lower end of said central section; said L-shaped guide elements and said central section of said plate member forming a generally vertically extending trackway.

19. An assembly as in claim 18, wherein said openings of said mounting plate include a plurality of relatively small openings adapted to receive headed fasteners, and elongated openings adapted to receive a belt-type fastener.

20. An assembly as in claim 9, wherein said support bracket includes an elongate support plate movable in said trackway of said mounting bracket and normally abutting said stop element of said mounting plate.

21. An assembly as in claim 20, and further including at least one resiliently flexible element carried by said support plate and moveable between an extended position and a retracted position, said flexible element when in said position preventing removal of said support plate from said trackway; and movement of said flexible element to same retracted position permitting removal of said support plate from said trackway.

* * * * *